(12) United States Patent
Ribarov et al.

(10) Patent No.: US 10,858,998 B2
(45) Date of Patent: Dec. 8, 2020

(54) FUEL DRAIN SYSTEM AND METHOD

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US); James S. Elder, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 611 days.

(21) Appl. No.: 15/042,302

(22) Filed: Feb. 12, 2016

(65) Prior Publication Data
US 2017/0234229 A1    Aug. 17, 2017

(51) Int. Cl.
| F02C 7/232 | (2006.01) |
| F02C 7/224 | (2006.01) |
| F02C 7/14 | (2006.01) |
| F01D 25/32 | (2006.01) |
| F02C 7/22 | (2006.01) |
| F02C 7/236 | (2006.01) |

(52) U.S. Cl.
CPC .............. *F02C 7/232* (2013.01); *F01D 25/32* (2013.01); *F02C 7/14* (2013.01); *F02C 7/222* (2013.01); *F02C 7/224* (2013.01); *F02C 7/236* (2013.01); *F05D 2260/602* (2013.01); *Y02T 50/675* (2013.01)

(58) Field of Classification Search
CPC .. F02C 7/14; F02C 7/222; F02C 7/224; F02C 7/232; F02C 7/236; F02C 9/36; F05D 2260/602; F01D 25/32

USPC ......................................................... 60/772
See application file for complete search history.

(56) References Cited

U.S. PATENT DOCUMENTS

| 3,841,089 A | 10/1974 | Clark |
| 3,901,025 A | 8/1975 | Bryerton et al. |
| 5,809,771 A | 9/1998 | Wernberg |
| 6,195,978 B1 | 3/2001 | Futa, Jr. |
| 6,314,998 B1 | 11/2001 | Futa, Jr. et al. |
| 6,334,296 B2 | 1/2002 | Futa, Jr. et al. |

(Continued)

FOREIGN PATENT DOCUMENTS

| EP | 1923544 A2 | 5/2008 |
| GB | 969748 A | 9/1964 |

(Continued)

OTHER PUBLICATIONS

Search Report regarding related EP App. No. 17155438.9; dated Jun. 30, 2017; 7 pgs.

*Primary Examiner* — Mark A Laurenzi
*Assistant Examiner* — Loren C Edwards
(74) *Attorney, Agent, or Firm* — Cantor Colburn LLP

(57) ABSTRACT

An engine fuel system is disclosed for managing drainage of fuel in response to an engine shut-down condition. For normal operation, a piston of a piston assembly is maintained in a first position by pressurized fuel in a volume on a first side of the piston. In response to engine shut-down, pressure is removed from the first side of the piston and fuel in the volume on the first side of the piston is drained into a return conduit that is part of the fuel system's thermal management system. Displacement of the piston in response to removal of pressure on the first side of the piston creates a volume on a second side of the piston for drainage of fuel from a fuel manifold.

20 Claims, 6 Drawing Sheets

(56) References Cited

U.S. PATENT DOCUMENTS

| | | |
|---|---|---|
| 6,422,021 B1 | 7/2002 | Futa, Jr. et al. |
| 6,619,025 B2 | 9/2003 | Wernberg |
| 6,807,801 B2 | 10/2004 | McCarty |
| 6,877,306 B2 | 4/2005 | Wernberg et al. |
| 7,093,420 B2 | 8/2006 | Futa, Jr. et al. |
| 7,131,274 B2 | 11/2006 | Baryshnikov |
| 7,200,985 B2 | 4/2007 | Tuttle et al. |
| 8,046,983 B2 | 11/2011 | Lawrence et al. |
| 8,083,204 B2 | 12/2011 | Maker |
| 8,122,699 B2 | 2/2012 | Lawrence et al. |
| 8,657,201 B2 | 2/2014 | Chiang |
| 2002/0184884 A1 | 12/2002 | McCarty |
| 2004/0025511 A1 | 2/2004 | McCarty |
| 2007/0245744 A1 | 10/2007 | Dooley |
| 2008/0115481 A1* | 5/2008 | Maker ................ F01D 25/32 60/39.094 |
| 2010/0037612 A1 | 2/2010 | Futa et al. |
| 2010/0058733 A1 | 3/2010 | Lawrence et al. |
| 2015/0285149 A1 | 10/2015 | Nguyen |

FOREIGN PATENT DOCUMENTS

| | | |
|---|---|---|
| WO | 0107767 A1 | 2/2001 |
| WO | 2009140100 A1 | 11/2009 |

\* cited by examiner

FUEL DRAIN SYSTEM AND METHOD

BACKGROUND

The present invention relates to combustion engines, and in particular to fuel systems for combustion engines.

Combustion engines such as gas turbine engines used for aircraft typically include one or more fuel manifolds that receive fuel from a main fuel tank and deliver that fuel to the engine. When the engine is shut down, fuel remaining in the fuel manifold can drain into the combustion chamber or otherwise escape. This can result in various problems, including but not limited to ecologically undesirable volatile organic compounds (VOC) emissions, undesirable fuel vapor fumes in vehicle passenger or crew areas, or excess liquid fuel or fuel vapor in the engine combustion chamber that can result in rough or smoky conditions at the next engine re-start.

Some gas turbine engine systems include an ecology tank for storing fuel from the fuel manifold after engine shut down. Such systems typically include a number of components, such as an ejector pump, check valves, vents, plumbing, and the ecology tank. These components can undesirably increase the cost, complexity, and weight of the fuel system. Also, venting systems included on ecology tanks to mitigate the risk of overpressure conditions can also present a risk for unwanted drainage in the case of a tank overflow. Some fuel systems provide for the fuel manifold to be drained directly back to the main fuel tank. However, the main inlet line from the fuel tank often has a check valve or pilot-operated valve preventing backflow in response to shutdown, keeping the pumps primed with fuel, so that such direct drain systems often require a second parallel drain back to the fuel tank, which, as with the ecology tank, can undesirably increase the cost, complexity, and weight of the fuel system. Additionally, some fuel system configurations are not compatible with a direct return line from the fuel manifold to the fuel tank, for various functional and operation reasons.

BRIEF DESCRIPTION

In some aspects of this disclosure, an engine fuel system comprises a fuel delivery flow path from a fuel tank to a fuel manifold. One or more fuel pumps for pumping fuel are disposed along the fuel delivery flow path. A fuel thermal management system comprising a heat absorption side of a heat exchanger is disposed along the fuel delivery flow path, and a fuel thermal management valve is configured to direct a portion of fuel from an outlet of the heat exchanger heat absorption side to a fuel return conduit in communication with the fuel tank (as used herein the term "communication" means fluid communication, including communication of fluid pressure). A piston assembly comprising a piston and a cylinder in disposed controllable communication with the fuel return conduit on a first side of the piston and in communication with the fuel manifold on a second side of the piston. The engine fuel system is configured to communicate pump discharge pressure to a first side of the piston in response to an engine operating condition to direct the piston to a first position, providing a volume of fuel in the cylinder on the first side of the piston. The engine fuel system is also configured to isolate the first side of the piston from pump discharge pressure in response to an engine shut-down condition to direct the piston to a second position, draining fuel from the volume on the first side of the cylinder to the fuel return conduit and draining fuel from the fuel manifold to a volume in the cylinder on the second side of the piston.

In some aspects of the disclosure, a method of operating a fuel system for an engine comprises pumping fuel along a fuel delivery flow path from a fuel tank to a fuel manifold, the fuel delivery flow path including a fuel thermal management system comprising a heat absorption side of a heat exchanger and a fuel thermal management valve. A portion of fuel from an outlet of the heat exchanger heat absorption side is directed to a fuel return conduit in communication with the fuel tank. In response to an engine operating condition, pump discharge pressure is communicated to a first side of a piston in a piston assembly comprising the piston and a cylinder to a first position, providing a volume of fuel in the cylinder on the first side of the piston. In response to an engine shut-down condition, the first side of the piston is isolated from pump discharge pressure, directing the piston to a second position to drain fuel from the volume on the first side of the piston to the fuel return conduit and drain fuel from the fuel manifold to a volume in the cylinder on the second side of the piston.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
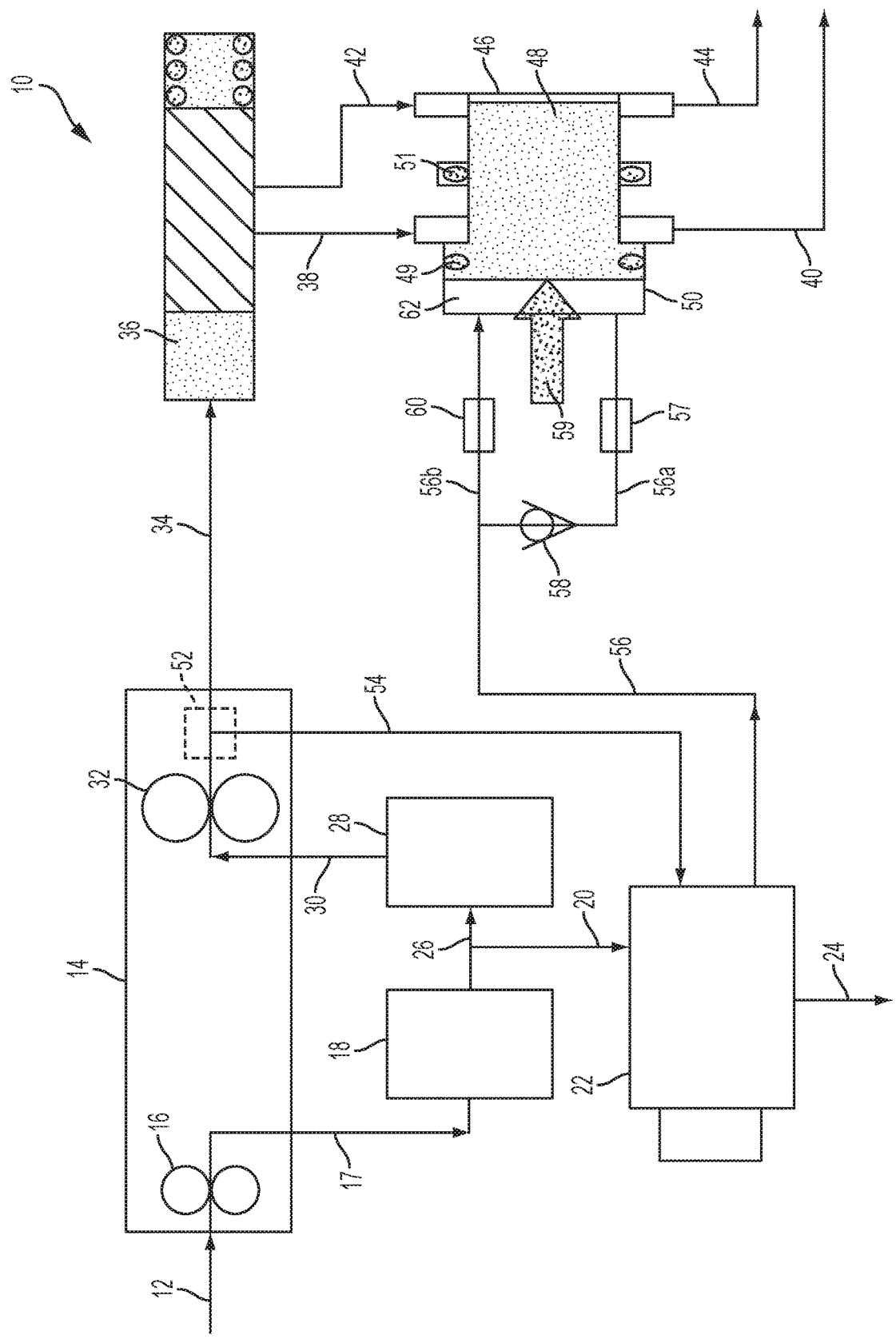
FIG. 1 is a schematic depiction of an example embodiment of a fuel system operating in accordance with an engine operating condition.

With reference now to the Figures, FIG. 1 schematically depicts a fuel system 10 operating in accordance with an engine operating condition (i.e., normal engine operation) with fuel being pumped to an engine combustion chamber such as the combustion chamber of a gas turbine engine. As shown in FIG. 1, fuel is pumped along a fuel feed flow path from a fuel tank (not shown) through conduit 12 and through a fuel management unit (FMU) 14. Fuel is pumped by a first pump 16, (also sometimes referred to as a low-pressure pump, which in some embodiments can have a discharge pressure of 50 psi to 250 psi) through conduit 17 to a heat absorption side of heat exchanger 18. A heat rejection side of heat exchanger 18 can have a fluid heat source such as engine oil (not shown), and this arrangement is used in some embodiments to provide concomitant benefits of cooling engine oil to specified operating temperatures while heating fuel to provide fuel efficiency benefits. However, in some embodiments, fuel feed flow rates and the heat load imparted by engine oil system cooling requirements can result in heating of fuel to temperatures at or above which coke deposits can form in the combustion chamber or on fuel components proximate to the combustion chamber such as fuel nozzles. Accordingly, in some embodiments, fuel is provided to the heat exchanger at flow rates above that needed for engine combustion in order to achieve a target fuel temperature, and a portion of the heated fuel is removed from the fuel feed flow path through conduit 20 and returned to the fuel tank through fuel thermal management valve 22 and fuel return conduit 24. Fuel for engine combustion continues along the fuel feed flow path through conduit 26 to filter 28, from which it is routed through conduit 30 to a second pump 32 (also sometimes referred to as a high-pressure pump, which in some embodiments can have a discharge pressure of 150 psi to 2500 psi). Fuel from the discharge of pump 32 continues along the fuel feed flow path through conduit 34 to fuel flow divider valve 36. Fuel flow divider valve is utilized to control a division of fuel flow between a primary flow path through conduits 38 and 40 to primary fuel manifold and nozzles at the engine combustion chamber (not shown), and a secondary flow path through conduits 42 and 44 to secondary fuel manifold and nozzles at the engine combustion chamber (not shown). The secondary nozzles are typically brought online in response to high fuel demand conditions such as certain flight cruising conditions or flight maneuvers. It should be noted here that the utilization of primary and secondary fuel flow paths and the associated hardware is optional, and not required for operation of all embodiments of this disclosure, and that some embodiments of the disclosure can operate in connection with only a single flow path or with multiple flow paths.

Piston assembly 46, including piston 48 disposed in cylinder 50 with O-ring seals 49 and 51, and associated connections are used to manage fuel drainage from the fuel manifold(s) in response to an engine shut-down condition, as discussed in more detail below (see, e.g., FIGS. 2 and 3). FIG. 1 depicts the engine fuel system 10 in accordance with an engine operating condition (i.e., normal engine operation) with fuel being fed to an engine for combustion. In this engine operating condition, pump discharge pressure from the discharge 52 of pump 32 is communicated through conduit 54, fuel thermal management valve 22, and conduit 56 to the cylinder 50. As shown in FIG. 1, the connection through conduit 56 is divided into parallel portions 56a and 56b. Conduit portion 56a includes an orifice 57 and also a check valve 58 that prevents flow and communication of pressure in the direction from the fuel thermal management valve 22 to the cylinder 50, but allows flow in the opposite direction. The check valve 58 thus directs the communication of pressure (represented by arrow 59) and fuel from the pump discharge 52 through the fuel thermal management valve 22, conduit 56, and orifice 60 to the cylinder 50 on a first side (i.e., the left side as depicted in FIG. 1) of the piston 48. Orifice 60 is sized to provide desired a specified slew rate (i.e., displacement rate) of the piston from left to right in response to engine and fuel pump startup. This pressure directs the piston 48 to a first position as shown in FIG. 1, providing a volume of fuel in a volume 62 in the cylinder on the first side of piston 48.

Figure 2:
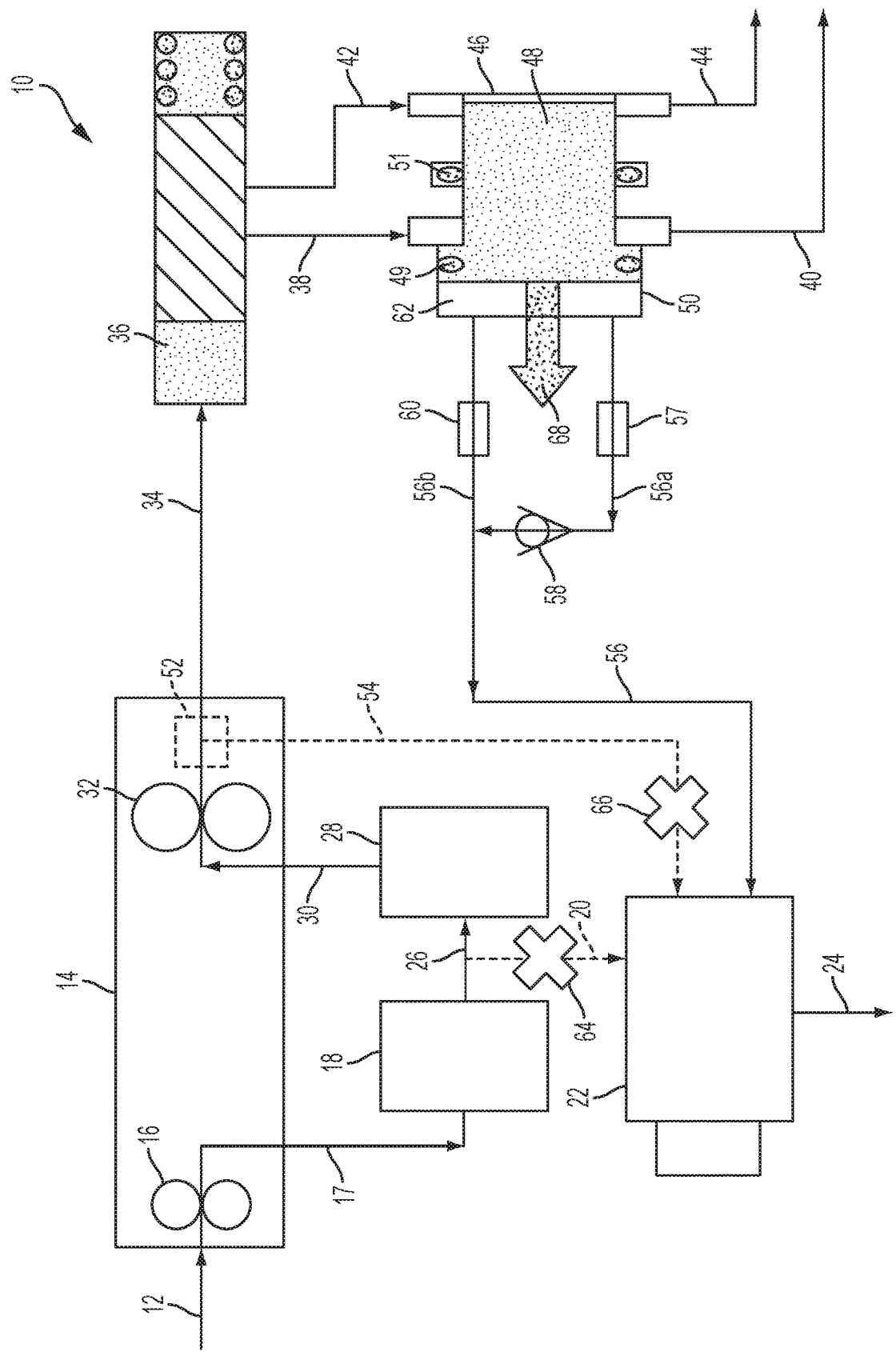
FIG. 2 is a schematic depiction of an example embodiment of a fuel system as it transitions from operating in accordance with an engine operating condition to an engine shut-down condition.
Figure 3:
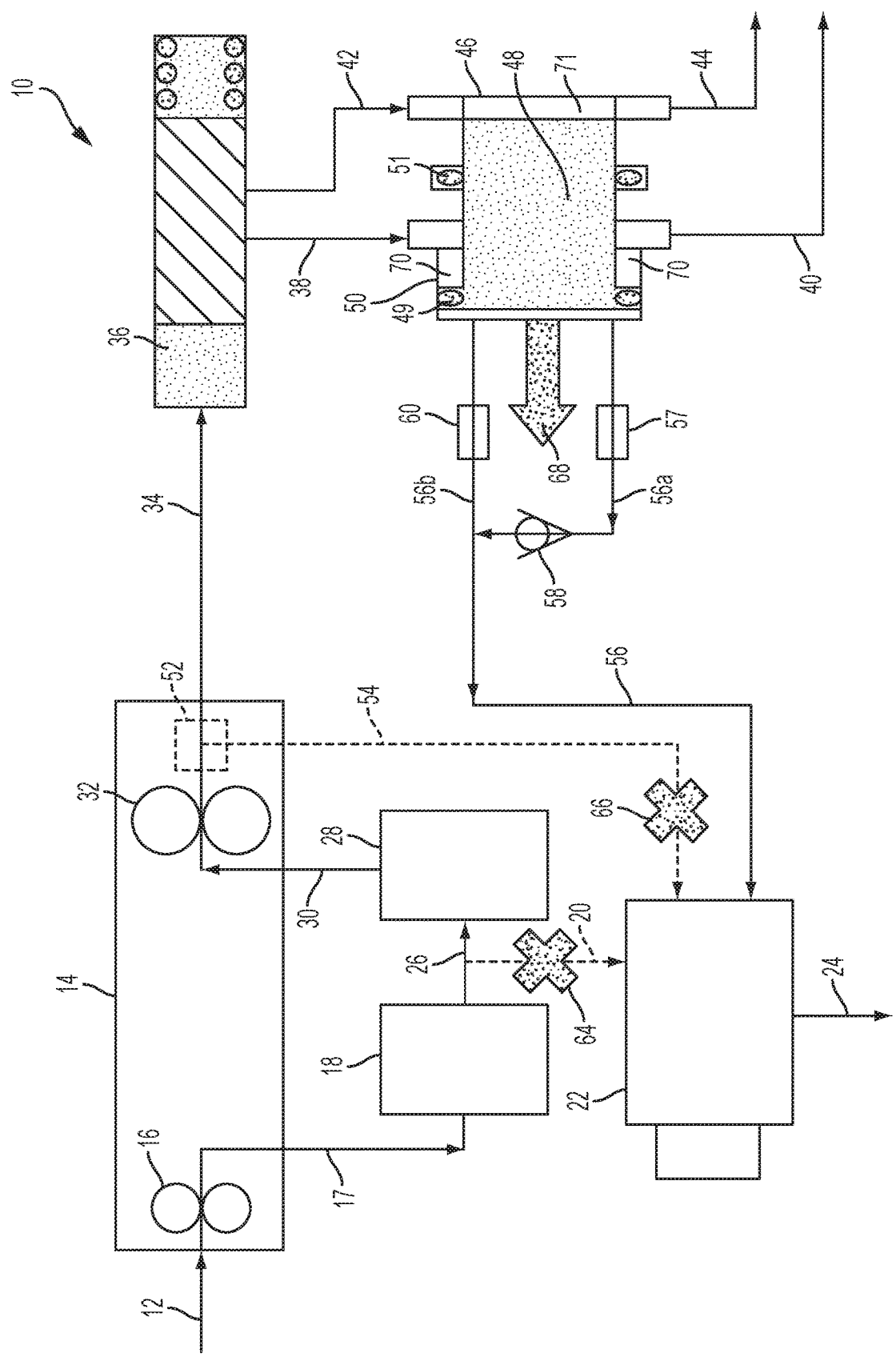
FIG. 3 is a schematic depiction of an example embodiment of a fuel system operating in a fuel drain mode in accordance with an engine shut-down condition.

Referring now to FIGS. 2 and 3, it should first be noted that the same reference numerals are used in FIG. 2 (and in FIGS. 3 and 6) to describe the same or similar components, and are not necessarily repeated in the description below. FIG. 2 schematically depicts the system 10 in an operational state as it begins to respond to an engine shut-down condition. As shown in FIG. 2, the fuel thermal management valve 22 interrupts the communication of conduit 20 with return conduit 24, as schematically represented by the dashed line 20 and the 'X' 64. The fuel thermal management valve 22 also interrupts the communication of pump discharge pressure from conduit 54 to conduit 56, as schematically represented by the dashed line 54 and the 'X' 66, and establishes communication between the conduit 56 and the fuel return conduit 24. The removal of pump discharge pressure from the left side of piston 48 causes a spring (not shown) to drive the piston 48 toward the left in the direction of arrow 68, as it begins to displace fuel from the volume 62 in the cylinder 50 into conduit 56a. FIG. 3 shows the system 10 in a completed drain mode. As shown in FIG. 3, piston 48 has moved to the left side of the cylinder 50, and the fuel that had previously been in the cylinder volume 62 has drained through the orifice 57 in conduit 56a, past the check valve 58, through the remainder of conduit 56, and through the fuel thermal management valve 22 and return conduit 24 into the fuel tank. Fuel from the fuel manifold has drained from the fuel manifold and into the piston assembly 46. Specifically fuel from the primary fuel manifold and nozzles drains to a volume 70 in the cylinder 50, and fuel from the secondary fuel manifold and nozzles drains to a volume 71. Orifice 57 can be sized to provide a specified slew rate (i.e., displacement rate) of the piston 48 from right to left in response to engine and fuel pump shut-down to accommodate a specified rate of fuel drainage from the primary and secondary fuel manifolds into the cylinder volumes 70 and 71, respectively. Orifice 57 can be smaller than orifice 60, or it can be larger than orifice 60, or it can be the same size as orifice 60. In some embodiments, orifice 57 can be sized larger than orifice 60 in order to accommodate rapid drainage of fuel from the fuel manifold into the cylinder volume 70.

Figure 4:
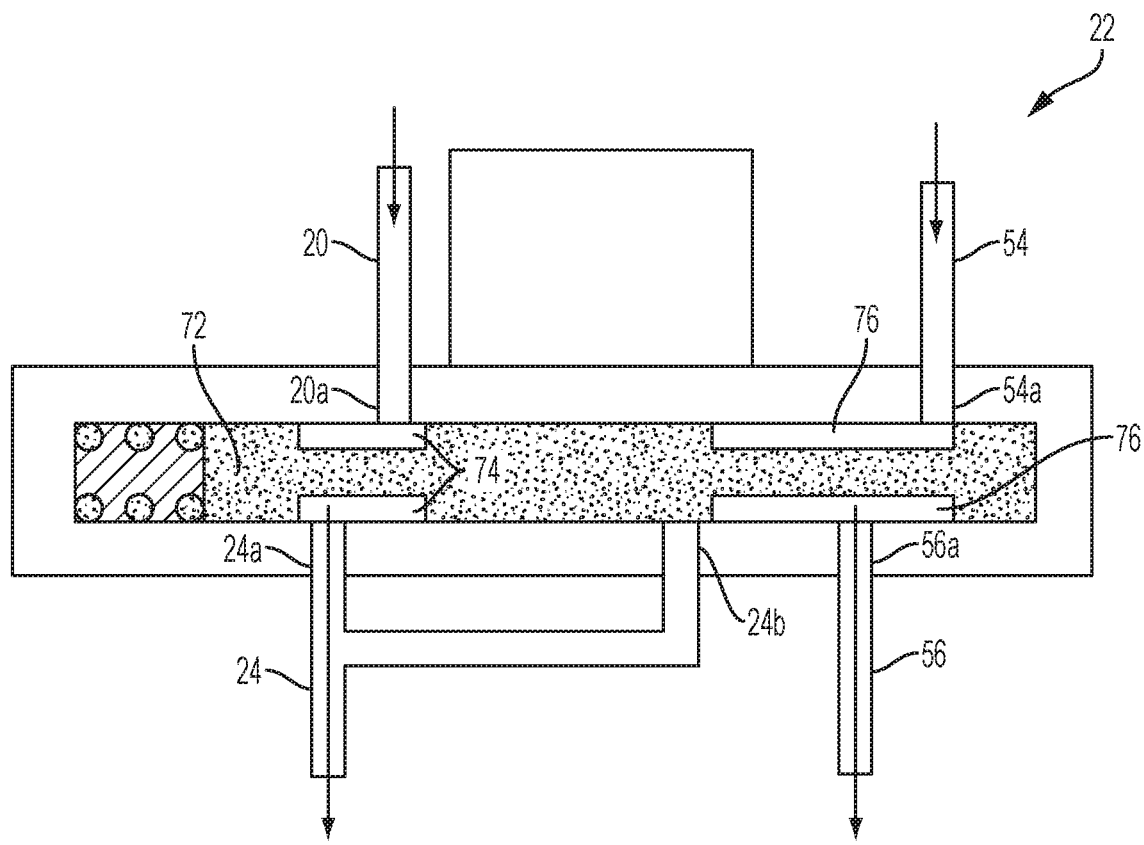
FIG. 4 is a schematic depiction of an example embodiment of a fuel thermal management valve operating in accordance with an engine operating condition.
Figure 5:
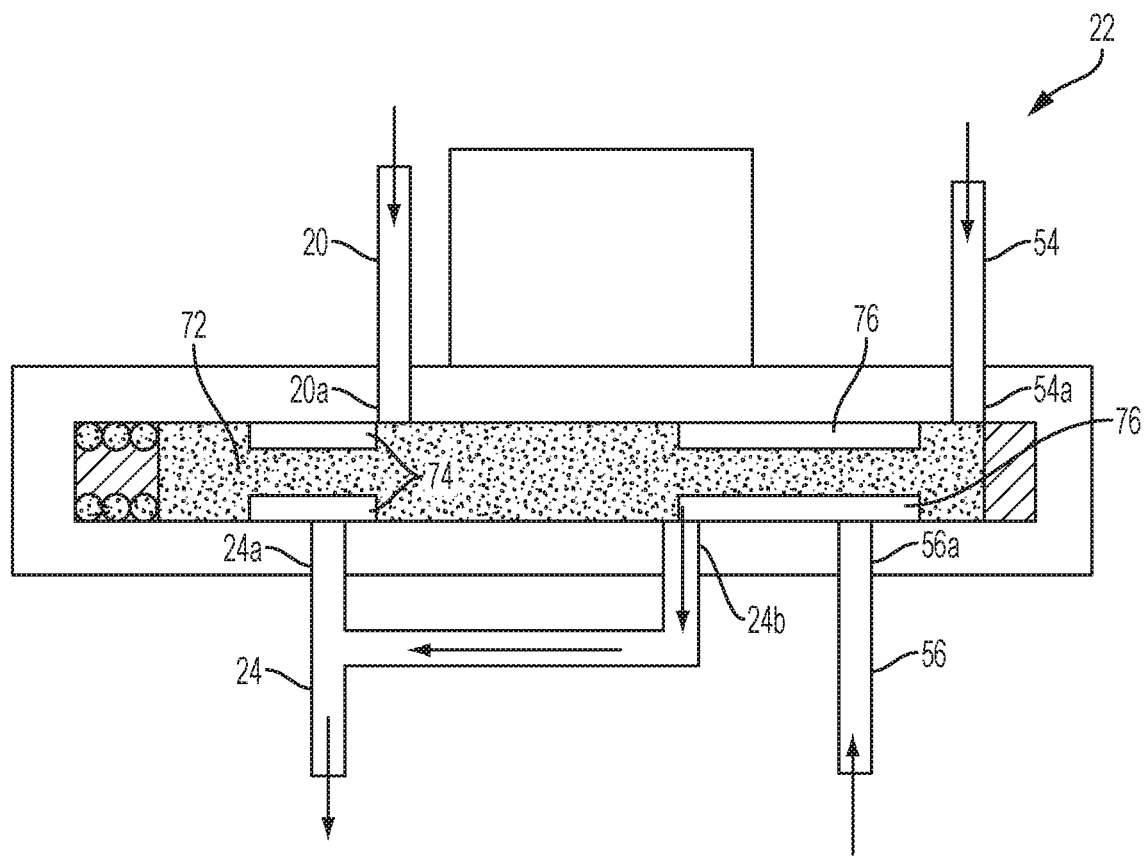
FIG. 5 is a schematic depiction of an example embodiment of a fuel thermal management valve operating in a fuel drain mode in accordance with an engine shut-down condition.

Referring now to FIGS. 4-5, these figures schematically depict additional details of the fuel thermal management valve 22 and its operation with respect to FIGS. 1-3. FIGS. 4-5 show the fuel thermal management valve 22 having a first port 20a associated with the conduit 20 in communication with the heat exchanger 18 (FIG. 1), a second port 24a associated with the fuel return conduit 24, an alternate second port 24b associated with fuel return conduit 24, a third port 54a associated with the conduit 54 in communication with pump discharge 52 (FIG. 1), and a fourth port 56a associated with conduit 56 in communication with the piston assembly 46 (FIG. 1). FIG. 4 schematically depicts the fuel thermal management valve 22 in an operational state associated with the engine operation condition of FIG. 1. As shown in FIG. 4, a valve body 72 is positioned so that port 20a is in communication with port 24a through passage 74, providing for return of a portion of the fuel flow from heat exchanger 18 (FIG. 1) to the fuel tank through return conduit 24. Port 54a is in communication with port 56a through passage 76, providing for communication of pump discharge pressure to piston assembly 46 (FIG. 1). FIG. 5 schematically depicts the fuel thermal management valve 22 in an operational state associated with the engine shut-down condition of FIGS. 2-3. As shown in FIG. 5, the valve body 72 has repositioned so that port 20a is isolated from port 24a, interrupting the flow of fuel from heat exchanger 18 (FIG. 3) to the fuel tank. Port 54a is also isolated from port 56a, interrupting communication of pump discharge pressure to piston assembly 46 (FIG. 3). However, port 56a is in communication with port 24*b*, establishing communication between the piston assembly 46 and the fuel return conduit 24 to allow for fuel in the cylinder volume 62 (FIG. 2) to drain to the fuel tank through fuel return conduit 24.

Figure 6:
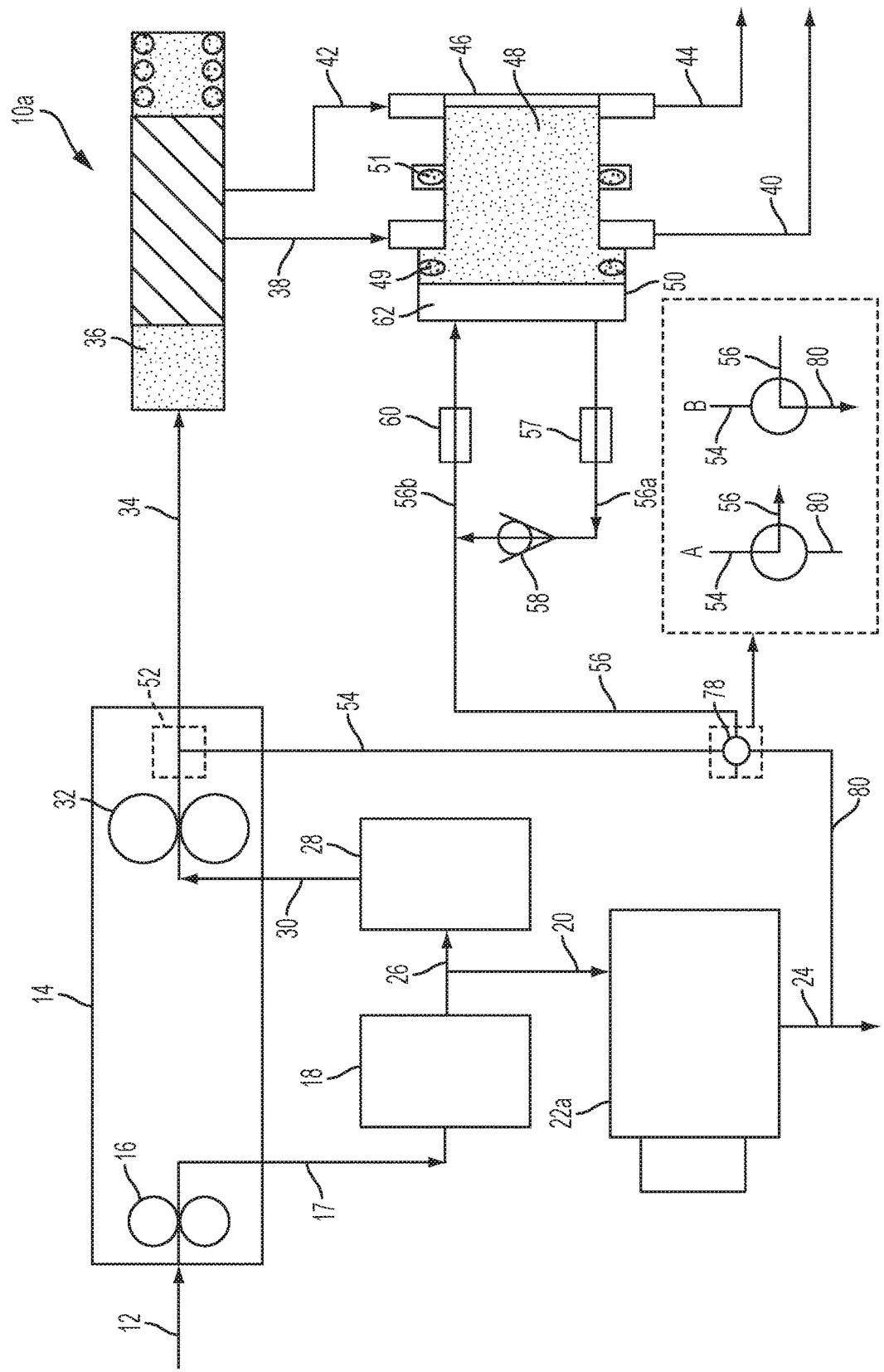
FIG. 6 is a schematic depiction of an alternative example embodiment of a fuel system configuration.

It should be noted that the embodiments disclosed herein are examples of specific configurations, and that many other configurations can be utilized. For example, FIGS. 1-5 depict a system where communication of pump discharge pressure to the piston assembly 46 passes through and is controlled by the fuel thermal management valve 22. Although this represents a highly efficient approach, it is not the only possible configuration. An alternate configuration is schematically depicted in FIG. 6 where a conventional fuel thermal management valve 22*a* controls only the return flow of a portion of the heated fuel from heat exchanger 18 to the fuel tank through fuel return conduit 24 in the same manner as described above for valve 22 in FIGS. 1-5, and a separate valve 78 is used to control the communication of pump discharge pressure to the piston assembly 46 and drainage of fuel from the cylinder volume 62 to the fuel tank through fuel return conduit 24. As shown in FIG. 6, a three-way valve 78 is connected to conduits 56 and 54, and to a conduit 80 connected to fuel return conduit 24. In response to an engine operating condition, the three-way valve 78 will be actively controlled to position 'A', establishing communication between conduits 54 and 56 (isolated from conduit 80) for communication of pump discharge pressure to the piston assembly 46. In response to an engine shut-down condition, the three-way valve 78 will be actively controlled to position 'B', isolating the conduit 54 from conduit 56, and establishing communication between conduits 56 and 80 to provide for drainage of fuel from the cylinder volume 62 to the fuel tank through fuel return conduit 24.

Although not required for operation of the embodiments disclosed herein, example embodiments can in some embodiments provide one or more various technical effects, including but not limited to avoidance of complex ejector and other equipment and operational parameters (e.g., power consumption by ejection system, risk of fuel spill, risk of air ingestion failure) associated with conventional ecology tank configurations where fuel is drained into an ecology tank separate from the fuel tank, returning fuel to the fuel tank utilizing existing conduits and equipment already required for fuel thermal management, or control of timing for fuel drainage.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An engine fuel system, comprising:
a fuel delivery flow path from a fuel tank to a fuel manifold;
a fuel pump for pumping fuel along the fuel delivery flow path;
a heat absorption side of a heat exchanger along the fuel delivery flow path;
a piston assembly comprising a piston and a cylinder in controllable communication with a fuel return conduit on a first side of the piston and in communication with the fuel manifold on a second side of the piston, configured to: (a) communicate pump discharge pressure to the first side of the piston in response to an engine operating condition including combustion in the engine to direct the piston to a first position, providing a volume of the fuel in the cylinder on the first side of the piston, and (b) isolate the first side of the piston from the pump discharge pressure in response to an engine shut-down condition to direct the piston to a second position, thereby draining the volume of the fuel in the cylinder on the first side of the piston to the fuel return conduit and draining the fuel from the fuel manifold to a volume in the cylinder on the second side of the piston; and
a fuel thermal management valve, arranged to receive a portion of fuel from the heat absorption side of the heat exchanger and to direct the portion of fuel received from the heat exchanger to the fuel tank in response to the engine operating condition including combustion in the engine, and to receive fuel from the fuel return conduit and to direct the fuel received from the fuel return conduit to the fuel tank in response to the engine shut-down condition.

2. The system of claim 1, wherein communication between the cylinder and the pump discharge pressure or fuel thermal management valve includes a conduit connection comprising a first conduit portion comprising a check valve that allows fluid flow from the cylinder to the fuel thermal management valve and prevents fluid flow from the fuel thermal management valve to the cylinder, and a second conduit portion parallel to the first conduit portion.

3. The system of claim 2, wherein the first conduit portion includes an orifice sized to provide piston movement from the first position to the second position in response to interruption of communication of pump discharge pressure to the first side of the piston and to accommodate drainage from the cylinder to the fuel thermal management valve, and the second conduit portion includes an orifice sized to provide piston movement from the second position to the first position in response to communication of pump discharge pressure to the first side of the piston.

4. The system of claim 3, wherein the first conduit orifice is sized larger than the second conduit orifice.

5. The system of claim 1, wherein the fuel thermal management valve comprises a first port in communication with an outlet of the heat exchanger absorption side, a second port in communication with the fuel tank, a third port in communication with a discharge of the fuel pump, and a fourth port in communication with the cylinder.

6. The system of claim 5, wherein the engine fuel system is configured to communicate the pump discharge pressure through the third and fourth ports to the first side of the piston in response to the engine operating condition, and to isolate the first side of the piston from the pump discharge pressure in response to the engine shut-down condition and establish communication between the cylinder and the fuel tank through the fourth and second ports.

7. The system of claim 6, wherein the fuel thermal management valve comprises a valve member moveable between a first position where the first port is in communication with the second port, and the third port is in communication with the fourth port; and a second position where the fourth port is in communication with the second port, and the first port is isolated from the second port.

8. The system of claim 7, wherein the third port is isolated from the fourth port in the valve member second position.

9. The system of claim 5, further comprising a pump discharge isolation valve that isolates the pump discharge from the fuel thermal management valve third port in response to the engine shut-down condition.

10. The system of claim 1, wherein the fuel thermal management valve includes a first valve that receives the fuel from the heat absorption side of the heat exchanger and directs the fuel to the fuel tank, and a second valve that is a three-way valve in communication with the pump discharge, the fuel return conduit from the cylinder, and the fuel tank, the second valve being controllable between a first position in response to the engine operating condition that provides communication between the pump discharge and the cylinder isolated from the fuel tank, and a second position in response to the engine shut-down condition that provides communication between the cylinder and the fuel tank isolated from the pump discharge.

11. The system of claim 1, comprising a low-pressure pump comprising an inlet in communication with the fuel tank and an outlet in communication with an inlet of the heat exchanger heat absorption side, a high-pressure pump having an inlet in communication with an outlet of the heat exchanger absorption side and an outlet in communication with the fuel manifold, wherein said pump discharge pressure is a discharge pressure of the high-pressure pump, and wherein the fuel thermal management valve is arranged to receive fuel from the fuel delivery flow path between the heat exchanger heat absorption side outlet and the high pressure pump inlet in response to the engine operating condition.

12. A method of operating a fuel system for an engine, comprising:
pumping fuel along a fuel delivery flow path from a fuel tank through a heat absorption side of a heat exchanger to a fuel manifold;
in response to an engine operating condition including combustion in the engine, communicating a pump discharge pressure to a first side of a piston in a piston assembly comprising the piston and a cylinder and directing the piston to a first position, providing a volume of fuel in the cylinder on the first side of the piston, directing a portion of the fuel from the heat absorption side of the heat exchanger to the fuel manifold, directing a different portion of the fuel from the heat absorption side of the heat exchanger to a fuel thermal management valve, and directing the fuel from the fuel thermal management valve to the fuel tank; and
in response to an engine shut-down condition, isolating the first side of the piston from the pump discharge pressure and directing the piston to a second position, draining the fuel from the fuel manifold to a volume in the cylinder on a second side of the piston, draining the fuel from the volume on the first side of the piston to the fuel thermal management valve, and directing the fuel from the fuel thermal management valve to the fuel tank.

13. The method of claim 12, further comprising:
in response to the engine shut-down condition, draining the volume of fuel in the cylinder on the first side of the piston through a first conduit portion comprising an orifice sized to provide piston movement from the first position to the second position and to accommodate drainage from the cylinder to a fuel return conduit in response to interruption of communication of the pump discharge pressure to the first side of the piston and a check valve that allows fluid flow from the cylinder to the fuel return conduit and prevents fluid flow from the fuel return conduit to the cylinder and communicating the pump discharge pressure to the first side of the piston; and
in response to the engine operating condition, communicating the pump discharge pressure and the fuel through a second conduit portion, parallel to the first conduit portion comprising an orifice sized to provide piston movement from the second position to the first position in response to communication of the pump discharge pressure to the first side of the piston.

14. The method of claim 12, further comprising:
in response to the engine operating condition communicating the portion of fuel from an outlet of the heat exchanger absorption side to a first port of the fuel thermal management valve and from a second port of the fuel thermal management valve to the fuel tank, and communicating the pump discharge pressure to a third port of the fuel thermal management valve and from a fourth port of the fuel thermal management valve to the first side of the piston; and
in response to the engine shut-down condition, isolating the first side of the piston from the pump discharge pressure and establishing communication between the cylinder and the fuel tank through the fourth and second ports.

15. The method of claim 14, further comprising moving a valve member in the fuel thermal management valve to a first position in response to the engine operating condition where the first port is in communication with the second port, and the third port is in communication with the fourth port; and moving the valve member to a second position in response to the engine shut-down condition where the fourth port is in communication with the second port, and the first port is isolated from the second port.

16. The method of claim 15, wherein the third port is isolated from the fourth port in the valve member second position.

17. The method of claim 14, further comprising closing a pump discharge isolation valve that isolates a pump discharge from the fuel thermal management valve third port in response to the engine shut-down condition.

18. The method of claim 12, further comprising controlling a three-way valve in communication with a pump discharge, the cylinder, and the fuel tank, between a first position in response to the engine operating condition that provides communication between the pump discharge and the cylinder isolated from the fuel tank, and a second position in response to the engine shut-down condition that provides communication between the cylinder and the fuel tank isolated from the pump discharge.

19. The method of claim 18, further comprising controlling the fuel thermal management valve to isolate an outlet of the heat exchanger heat absorption side from the fuel tank in response to the engine shut-down condition.

20. The method of claim 12, further comprising operating a low-pressure pump to pump fuel from the fuel tank to the heat exchanger heat absorption side, operating a high-pressure pump to pump a portion of fuel from an outlet of the heat exchanger heat absorption side to the fuel manifold, communicating discharge pressure from the high pressure pump to the first side of the piston, and directing fuel from the fuel delivery flow path between the heat exchanger heat absorption side outlet and an inlet of the high pressure pump to the fuel thermal management valve in response to the engine operating condition.

\* \* \* \* \*